United States Patent
Strandell

(10) Patent No.: US 9,555,501 B2
(45) Date of Patent: Jan. 31, 2017

(54) PROCESS FOR OBTAINING A MECHANICAL COMPONENT

(71) Applicant: AKTIEBOLAGET SKF, Göteborg (SE)

(72) Inventor: Ingemar Strandell, Sävedalen (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/782,797

(22) PCT Filed: Apr. 7, 2014

(86) PCT No.: PCT/SE2014/000038
§ 371 (c)(1),
(2) Date: Oct. 7, 2015

(87) PCT Pub. No.: WO2014/168542
PCT Pub. Date: Oct. 16, 2014

(65) Prior Publication Data
US 2016/0318119 A1 Nov. 3, 2016

(30) Foreign Application Priority Data
Apr. 9, 2013 (SE) ...................................... 1300257

(51) Int. Cl.
*B23K 20/00* (2006.01)
*B23K 20/02* (2006.01)
(Continued)

(52) U.S. Cl.
CPC ........... *B23K 20/023* (2013.01); *B23K 20/021* (2013.01); *F16C 33/62* (2013.01); *F16C 33/64* (2013.01)

(58) Field of Classification Search
CPC ................. B23K 20/02–20/026; F16C 33/62; F16C 33/64
(Continued)

(56) References Cited

U.S. PATENT DOCUMENTS 2,033,240 A * 3/1936 Hardy ........................ C22C 1/04
29/898.14
2,765,520 A * 10/1956 Donley .................. F16C 33/14
205/170
(Continued)

FOREIGN PATENT DOCUMENTS

EP 1882109 B1 4/2009
GB 729720 A * 5/1955 .............. F16C 33/12
(Continued)

*Primary Examiner* — Kiley Stoner
(74) *Attorney, Agent, or Firm* — Bryan Peckjian; SKF USA Inc. Patent Dept.

(57) ABSTRACT

A process for obtaining a mechanical component by joining a first metallic material and a second metallic material. The process comprises: (A) putting the first material and the second material in contact with each other, (B) fixating a sheet metal element onto the first material to at least partly enclosing the second material and so that the sheet metal element is at least partly in contact with the second material. The sheet metal element comprises carbon, joining the first material and the second material by diffusion welding. The carbon activity of the second material $Ca_2$ and the carbon activity of the sheet metal element $Ca_m$ at the temperature of joining fulfills a relation $Ca_2 \leq Ca_m$.

11 Claims, 1 Drawing Sheet

(51) Int. Cl.
*F16C 33/62* (2006.01)
*F16C 33/64* (2006.01)

(58) Field of Classification Search
USPC .......................... 228/193–195, 262.4–262.45
See application file for complete search history.

(56) References Cited

U.S. PATENT DOCUMENTS

| | | | | |
|---|---|---|---|---|
| 3,632,368 | A * | 1/1972 | Nelson | C23C 24/04 427/190 |
| 4,699,309 | A * | 10/1987 | Atsuta | B23K 20/22 228/116 |
| 5,056,936 | A * | 10/1991 | Mahrus | F16C 9/00 384/276 |
| 2002/0142186 | A1* | 10/2002 | Sato | B22F 7/04 428/676 |
| 2002/0174545 | A1* | 11/2002 | Kiyosawa | B23P 15/003 29/898.063 |
| 2003/0134144 | A1* | 7/2003 | Muroshige | B23K 20/04 428/683 |
| 2005/0217420 | A1* | 10/2005 | Kobayashi | F16H 49/001 74/640 |
| 2007/0214644 | A1* | 9/2007 | Kanai | B23K 20/002 29/893.37 |
| 2008/0212911 | A1 | 9/2008 | Beer et al. | |
| 2016/0303682 | A1* | 10/2016 | Strandell | B23K 20/023 |
| 2016/0303683 | A1* | 10/2016 | Strandell | B23K 20/227 |

FOREIGN PATENT DOCUMENTS

| | | | | |
|---|---|---|---|---|
| JP | 2000186714 | A | * | 7/2000 |
| JP | 2000326077 | A | * | 11/2000 |
| JP | 2002069563 | A |   | 3/2002 |

\* cited by examiner

PROCESS FOR OBTAINING A MECHANICAL COMPONENT

CROSS REFERENCE TO RELATED APPLICATION

This is a United States National Stage Application claiming the benefit of International Application Number PCT/SE2014/000038 filed on 7 Apr. 2014 (7 Apr. 2014), which claims the benefit of Sweden Patent Application 1300257-1 filed on 9 Apr. 2013 (9 Apr. 2013), both of which are incorporated herein by reference in their entireties.

TECHNICAL FIELD

The invention relates to a process for obtaining a mechanical component comprising at least two different materials. The mechanical component may for instance be a bearing component, such as a ring for a rolling bearing.

BACKGROUND OF THE INVENTION

To join two materials by means of diffusion welding is known in the art. One purpose of joining two materials may be to use materials with different characteristics for any type of mechanical component, such as for instance a rolling bearing. As regards rings of rolling bearings, it may be advantageous to use one material for the raceway surface onto which the rolling elements roll and another material for the core of the ring. One such composite bearing ring is presented in EP1882109B1 comprising a rolling bearing composite ring for an aircraft power plant which ring has been subjected to diffusion welding.

SUMMARY OF THE INVENTION

An object of the present invention is to provide an improved process for obtaining a mechanical component, which results in improved properties of the mechanical component.

The object has been achieved by a process for obtaining a mechanical component by joining a first and a second metallic material.

The process comprises the following steps:
putting the first and the second material in contact with each other,
fixating a sheet metal element onto the first material to at least partly enclosing the second material and so that the sheet metal element is at least partly in contact with the second material, wherein the sheet metal element comprises carbon,
joining the first and second material by means of diffusion welding, and wherein the carbon activity of the second material $Ca_2$ and the carbon activity of the sheet metal element $Ca_m$ at the temperature of joining fulfills the relation $Ca_2 \leq Ca_m$. It has been realized by the inventor that by having a sheet metal element and a second material as defined above in a diffusion welding process that fulfills the above relation, an improved diffusion welding process and joining of the first and second material will be accomplished. When the carbon activity of the sheet metal element and the second material fulfills the relation $Ca_2 \leq Ca_m$ no or essentially no carbon will be diffused from the second material to the sheet metal element. Further, in an embodiment, when the relation is $Ca_2 < Ca_m$ carbon will be diffused from the sheet metal element to the second material resulting in a surface enrichment of carbon of the second material. If the relation $Ca_2 \leq Ca_m$ is not fulfilled there is a clear risk that carbon will be diffused from the second material to the sheet metal element, which is not wanted, and which could lead to a decreased performance of the resulting surface of the second material, such as reduced surface hardness and also reduced wear resistance.

Carbon activity is a central term used to describe the invention. A carbon potential is explained by the ability of an environment containing active carbon to alter or maintain, under prescribed conditions, the carbon level of a steel. In any particular environment, the carbon level attained will depend on such factors as temperature, time and steel composition. Carbon potential is thus a difference in carbon activity between e.g two materials. Thus if there is a difference in carbon activity, i.e when the carbon potential is not zero, the carbon will diffuse from one material to the other.

In a surface enrichment process like for instance a carburizing process for a steel component, a carbon potential in the furnace atmosphere will drive carbon into the steel surface of the component. When the carbon activity is larger in the atmosphere than the carbon activity in the steel, carbon is driven by the potential=carbon activity difference between furnace atmosphere and steel. In the steel component, there may also be a carbon concentration difference between the surface and the bulk (or inner region) of the steel component. If the steel before the surface enrichment process started were homogenous the carbon concentration differences would be the driving force for the diffusion process. The carbon potential or carbon activity difference between surface and bulk is in this case proportional to the carbon concentration differences between surface and bulk. The diffusion process will continue as long as there is a potential difference between atmosphere and surface and between surface and bulk. Carbon diffusion in a material in which the microstructure and or alloying content is varying as a function of depth from surface is described with the difference in carbon activity. The diffusion will occur until the carbon activities are equal. Driving potential for carbon diffusion is determined with differences in carbon activities and not by the differences in carbon concentrations for the material. If a system consisting of two materials has no carbon diffusion it means that, there is no carbon potential for the system. Both materials have the same carbon activities and there is no potential for driving the carbon transport. By this insight, which has been realized by the inventor, the skilled person would understand if a first and a second material at a specific temperature presents a difference in carbon activity, and thus that there is a carbon potential for the two materials at the specific temperature.

In an embodiment of the present invention, the sheet metal element is enclosing the second material and creates a closed space for the second material. It may be necessary when performing a diffusion welding process to enclose the second material and thereby create a closed space for the second material.

In an embodiment of the present invention, the diffusion welding is made by hot isostatic pressing (HIP). Hot isostatic pressing is an effective method to join two materials. In an embodiment, the hot isostatic pressing is conducted at a temperature of between 1000-1300 degrees Celcius. In another embodiment, the hot isostatic pressing is conducted at a temperature of between 1050-1250 degrees Celcius. In another embodiment, the hot isostatic pressing is conducted at a temperature of 1100-1200 degrees Celcius. In another embodiment, the hot isostatic pressing is conducted at a temperature of 1150 degrees Celcius. In another embodiment, the hot isostatic pressing is performed during 1 to 6 hours. In a further embodiment, the hot isostatic pressing is performed during 2 to 4 hours. In another embodiment, hot isostatic pressing is conducted with a pressure of 80-310 MPa.

In an embodiment of the present invention, the second material before it is joined is in the form of a metallic powder. When the second material is in the form of a powder before it is joined it may be necessary to enclose the material and to create a closed space for the material. Thus, the inventor has realized that the sheet metal element that creates the closed space may be used to perform a carbon surface enrichment of the second material during the joining process. Thus, there will be no need for any subsequent surface enrichment steps after the joining process has been performed. Further, the relation $Ca_2 \leq Ca_m$ always ascertains that there is no substantial diffusion occurring from the second material to the sheet metal element.

In an embodiment of the present invention, the sheet metal element further comprises nitrogen. Also nitrogen may be diffused into the second material from the sheet metal element. In an embodiment, the nitrogen activity of the second material Ni2 and the nitrogen activity of the sheet metal element Nim fulfill the relation Ni2≤Nim. Nitrogen activity and nitrogen potential have the same definition and relation as carbon activity and carbon potential, which is described above. In some instances, it may also be advantageous to diffuse nitrogen into the second material.

In an embodiment, the mechanical component is a bearing component. In a further embodiment, the bearing component may be any of an inner ring of a bearing, an outer ring of a bearing or a roller of a roller bearing.

In another embodiment, the mechanical component is a roll mantle of a roll line for a continuous casting machine.

The mechanical component may be any component that has been joined by a diffusion welding process as described in any of the embodiments.

In an embodiment, the second material is a high performance bearing steel. In a further embodiment, the high performance bearing steel is a M50 steel. In a further embodiment the high performance bearing steel is a M50NIL steel. In yet another embodiment the high performance bearing steel is any of the traditional bearing steels as shown in ISO 683-17:1999(E) pages 9-10. Any other steels that meet the steel cleanliness and hardness requirements of a bearing component could be used, for instance stainless tool steels. In a further embodiment the material used is a N-alloyed stainless steel suitable for martensitic hardening or XD15NW made with good steel cleanliness. Further, stainless steels suitable for surface enrichment and martensitic hardening may be used. The invention is however not limited to these steels. The benefit of using these types of steel is that the portion consisting of this material will be very robust against wear and corrosion for instance. Hence the high quality bearing steel is preferably located around the highly stressed areas of the bearing components, for instance around the raceway of the rings or the rolling surface of the roller. It could also be located for instance at a flange or any other portion or area of the bearing component, or combinations of flange, raceways and rolling surfaces. In the embodiment where the mechanical component is a roll mantle, the second material is preferably located at the outer surface or the roll mantle onto which a steel slab is meant to be received. In a further embodiment of the roll mantle, the second material is a high performance steel which is suitable for the harsh environment in continuous casting.

In an embodiment, the first material is any of a cast iron, a cast steel, a hot rolled steel or a cold rolled steel.

In an embodiment, the sheet metal element has been fixated to the first material by means of welding. This will result in a reliable fixation of the sheet metal to the first material and also a hermetically closed space for the second material which may be necessary for the diffusion welding process, and especially when the process is hot isostatic pressing.

BRIEF DESCRIPTION OF DRAWINGS

Exemplifying embodiments of the present invention will now be described in more detail, with reference to the accompanying drawings, wherein.

Figure 1:
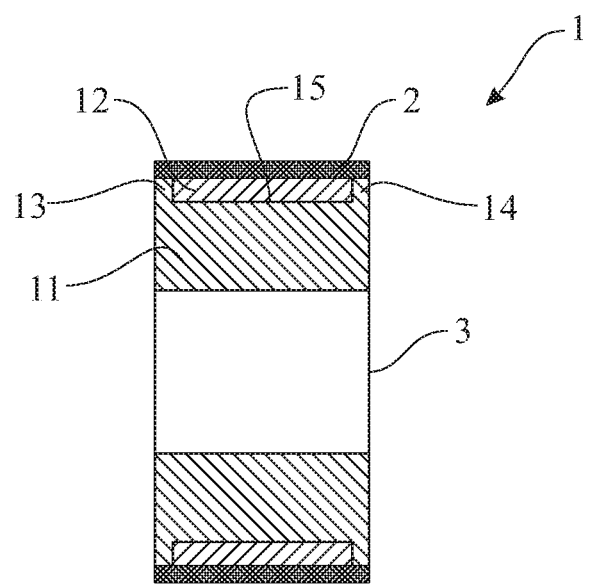
FIG. 1 shows a cross-sectional view of a mechanical component according to an embodiment of the invention.

The drawings show diagrammatic exemplifying embodiments of the present invention and are thus not drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF DRAWINGS

FIG. 1 shows an illustration of a cross section of a mechanical component, which in this illustration is a bearing component 1. The bearing component 1 comprises a first metallic material 11 and a second metallic material 12 which has been joined by diffusion welding. Diffusion welding will lead to that the first material 11 and the second material 12 will diffuse into each other leading to a tight bond between the two materials 11 and 12. For the diffusion welding process, a sheet metal element 2 has been fixated onto the first material 11, in this embodiment the core or body part of the bearing component 1. The bearing component 1 is in this embodiment an inner ring of a bearing, wherein the second material 12 at least partly is intended to be a raceway on the inner ring onto which rolling elements is intended to roll. Further, the bearing component comprises a through-hole 3 into which a shaft (not shown) may be fitted. The sheet metal element 2 is intended to create a closed space for the second material 12 during the diffusion welding process, which may be made by hot isostatic pressing. Hot isostatic pressing requires that a closed space is created, especially when the second material 12 is in powder form before joining. The sheet metal element 2 is in this embodiment fixated to the first material 11 via two flanges 13 and 14. The two flanges 13 and 14 also create a groove 15 for the second material 12. This is an advantageous design for creating the closed space for the second material 12 and for the hot isostatic pressing process. Further, the design allows the second material 12 to only be present where it is needed, viz. at the rolling contact surface (the raceway). The second material 12 may be a high performance bearing steel, such as M50 or M50 Nil. The steel 12 may be any wear resistant steel, corrosion resistant steel, or any other suitable metallic material depending on the demands of the mechanical component in its intended application. The carbon activity of the second material 12

$Ca_2$ and the carbon activity of the sheet metal element 2 $Ca_m$ at the temperature of joining fulfills the relation $Ca_2 \leq Ca_m$. This leads to that no or substantially no carbon will be diffused from the second material 12 to the sheet metal element 2. It is as stated above not good for the second material 12 if carbon would be diffused from it to the sheet metal element 2 during the diffusion welding process, for instance by means of hot isostatic pressing. This is especially true when there are high demands for the second material 12 due to wear resistance etc., such as for a rolling bearing component. Further, if the carbon activity in the sheet metal is higher than in the second material at the temperature of joining, carbon will be diffused into the second material 12. This would result in a surface enriched with carbon which would lead to an increased hardness and wear resistance of the outer surface of the second material 12. Other elements, such as nitrogen may also be diffused into the second material 12 during the diffusion welding process from the sheet metal element 2, depending on the properties that are wanted for the final mechanical component 1.

Figure 2:
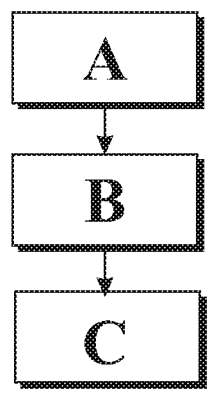
FIG. 2 shows a flow diagram of an embodiment of the process according to the invention.

FIG. 2 is an illustration showing a flow diagram representing an embodiment of the present invention. In step A, the first 11 and the second material 12 are put in contact with each other. In step B, a sheet metal element 2 is fixated onto the first material 11 to enclose the second material 12 and so that the sheet metal element 2 is at least partly in contact with the second material 12. The sheet metal element 2 also comprises carbon. In step C, the first 11 and the second 12 material are joined by means of diffusion welding, for instance hot isostatic pressing. Further, the carbon activity of the second material 12 $Ca_2$ and the carbon activity of the sheet metal element 2 $Ca_m$ at the temperature of joining fulfills the relation $Ca_2 \leq Ca_m$.

The invention claimed is:

1. A process for obtaining a mechanical component by joining a first and a second metallic material, the process comprising steps of:
    (A) putting the first and the second material in contact with each other;
    (B) fixating a sheet metal element onto the first material to at least partly enclosing the second material and so that the sheet metal element is at least partly in contact with the second material, wherein the sheet metal element comprises carbon;
    (C) joining the first and second material by means of diffusion welding; and
    wherein the carbon activity of the second material $Ca_2$ and the carbon activity of the sheet metal element $Ca_m$ at the temperature of joining fulfills the relation $Ca_2 \leq Ca_m$.

2. The process according to claim 1,
wherein the sheet metal element is enclosing the second material and creates a closed space for the second material.

3. The process according to claim 1,
wherein the second material, before it is joined, is in a form of a metallic powder.

4. The process according to claim 1,
wherein the carbon activity of the second material $Ca_2$ and the carbon activity of the sheet metal element $Ca_m$ at the temperature of joining fulfills the relation $Ca_2 < Ca_m$.

5. The process according to claim 1,
wherein the sheet metal element further comprises nitrogen.

6. The process according to claim 1,
wherein the second material is a high performance bearing steel.

7. The process according to claim 6,
wherein the high performance bearing steel is one of:
M50,
M50 NIL,
XD15NW,
Bearing steel as shown in ISO 683-17:1999(E) pages 9-10,
Stainless tool steel,
Stainless steel suitable for martensitic hardening,
N-alloyed stainless steel, suitable for martensitic hardening, or
Stainless steel suitable for surface enrichment and martensitic hardening.

8. The process according to claim 1,
wherein the first material is one of:
a cast iron,
a cast steel,
a hot rolled steel, or
a cold rolled steel.

9. The process according to claim 1,
wherein the mechanical component is a bearing component.

10. The process according to claim 9,
wherein the bearing component is one of:
an inner ring of a bearing,
an outer ring of a bearing, or
a roller of a roller bearing.

11. The process according to claim 1,
wherein the diffusion welding is made by hot isostatic pressing (HIP).

* * * * *